Nov. 26, 1957  L. M. C. SEAMARK  2,814,508
INTERNAL AND SEGMENTED EXTERNAL PIPE COUPLING
SLEEVES WITH FLUID PRESSURE SEAL
Filed Oct. 19, 1955  2 Sheets-Sheet 1

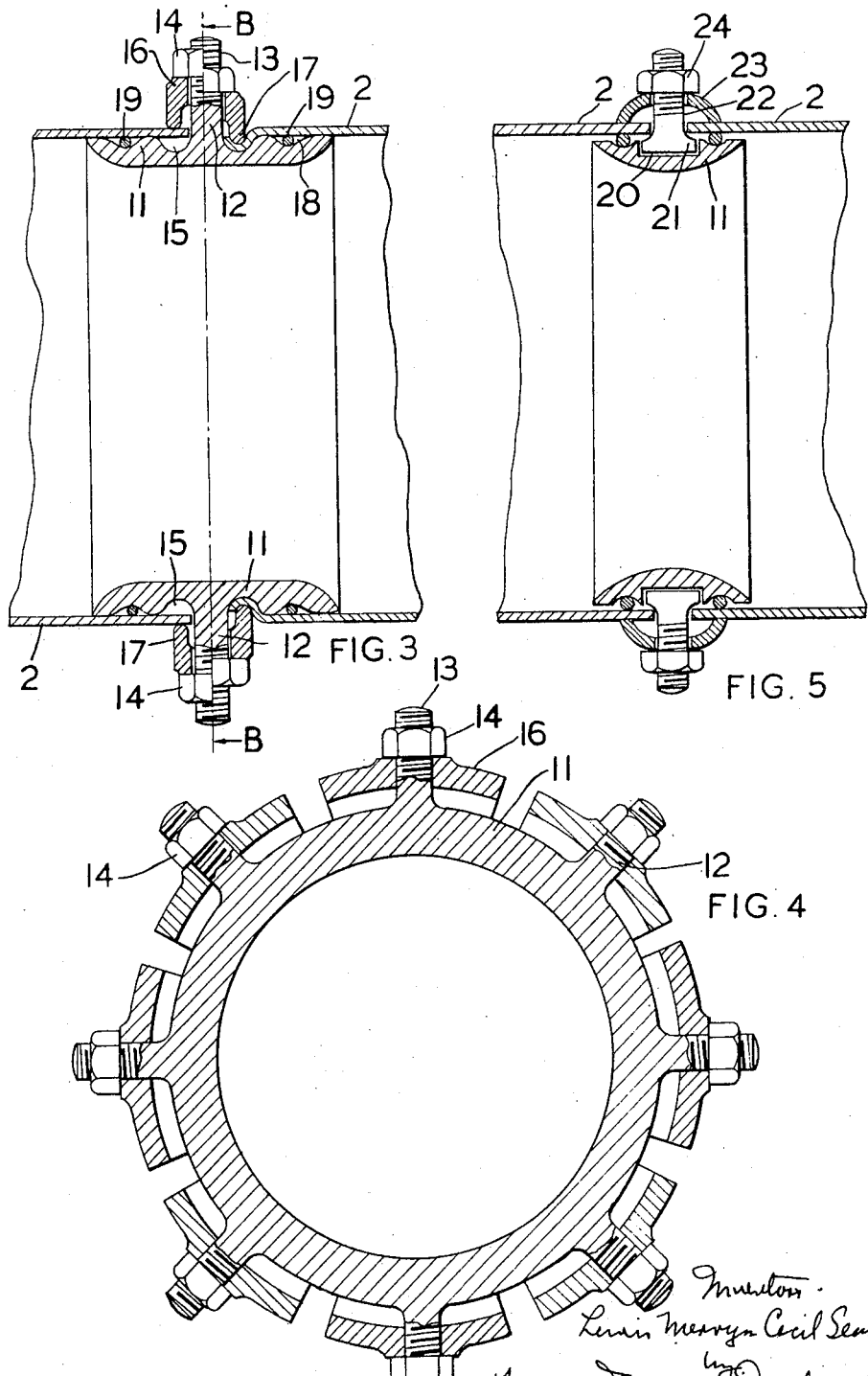

2,814,508

INTERNAL AND SEGMENTED EXTERNAL PIPE COUPLING SLEEVES WITH FLUID PRESSURE SEAL

Lewis Mervyn Cecil Seamark, Pyne Cliff, Lyme Regis, Dorset, England

Application October 19, 1955, Serial No. 541,443

12 Claims. (Cl. 285—95)

The invention relates to pipe couplings for the coupling of pipes made of high strength material having thin walls, and which for this reason are not adapted to be connected together by means of couplings of the kind in which the pressure to form the coupling is applied solely on the outer surfaces of the walls of the pipes.

The invention has as its principal object to provide a coupling of simple construction which is effective to provide a liquid- and gas-tight seal in both directions of application of the pressure applied, that is to say, whether the pressure is exerted from inside the pipe outwardly, or from outside the pipe inwardly.

The known method of forming screw-threads on the pipe ends results in a high proportion of the wall of the pipe being removed with resultant weakening of the wall, while the method of welding together the pipe ends is not always a satisfactory in situ method, and is, inter alia, often undesirable owing to the permanency of the coupling.

The invention is of particular application to the coupling of thin-walled pipes of large diameter and has among its objects to provide a coupling which necessitates no previous preparation of the pipe ends before coupling.

A further object of the invention is to provide a coupling which affords an effective seal against both external pressure inwardly applied, and internal pressure outwardly applied, while at the same time affording adequate resistance against end pull on the pipes.

According to the invention a pipe coupling comprises a metal ring or cylinder mounted internally of the pipes to be joined to extend across the joint, radial members secured to or formed integral with the ring or cylinder with screw-threaded ends projecting outwardly at positions between the adjacent end faces of the pipes, through holes formed in clamping plates which are secured in positions externally of the pipes by means of nuts screwed onto the projecting screw-threaded ends of the radial members.

The undersurfaces of the plates are preferably toothed, serrated or roughed and advantageously curved to correspond to the outer curvature of the pipes. At the ends of the pipes which are to be coupled annular grooves are being provided on the outer surfaces of the ring at positions near the edges to receive sealing rings, for example rubber rings, advantageously of circular section, which rings are moveable to one or other of the ends of the grooves according as the pressure on the pipe is exerted from inside the pipe outwardly or from outside the pipe inwardly, thus forming a liquid- and gas-tight seal in both cases.

It will thus be understood that the ends of the pipes are immovably held between the internal annular insertion ring and the outer clamping plates without any possibility of crushing the pipes at the position of the coupling, and that a liquid- and gas-tight seal is obtained in both directions of application of pressure.

According to the invention, furthermore, the pipe coupling comprises a cylindrical support, the ends of which are adapted for insertion respectively in the ends of the pipes to be coupled together, means held in determined relation with the support to project radially between the respective ends of the pipes, members mounted on the projecting means, and pressure applying means cooperating with the projecting means for applying pressure on said members to cause the walls of the pipes at the ends to be pressed into engagement with the outer peripheral surface of the cylindrical support.

The walls of the pipes are pressed into circumferential grooves formed in the outer peripheral wall of the ring at positions near the inner ends of the studs, whereby the ends of the pipes are held against end or axial pull.

Circumferential grooves may, according to the invention furthermore, be provided in the outer periphery of the ring, advantageously at positions near the side edges of the ring, to receive rings of a resilient material such as rubber, the grooves being provided as shallow wide grooves so that, on pressure being applied either from inside the pipe outwardly or from outside the pipe inwardly, a fluid-tight seal is formed by the resilient rings being forced towards the respective sides of the grooves.

According to the invention furthermore, instead of the pipe ends being deformed by pressure applied downwardly to cause the pipes to be deformed at a number of positions or wholly around the pipe ends, the pressure may be applied to deform the pipe ends by turning the pipe ends upwardly, so as to provide a force to oppose end pull on the pipes. Thus, the ring may be formed at a mid-position on the outer periphery with a circumferential groove to receive the base or bases, formed with laterally extending flanges, of a series of radially extending studs screw-threaded at the ends, the flanges supporting at each side of the studs, the terminal edges of the pipe ends and the ends of the studs projecting through an outer ring or plate of dome-shape or curved section, so that on pressure being applied by screwing down the nuts on the screw-threaded ends of the studs, the flanges of the bases of the studs press the terminal edges of the pipes upwardly into the spaces formed by the configuration of the water ring, whereby the ends of the pipes are securely held against end pull.

The invention is diagrammatically illustrated by way of example in the accompanying drawings, in which Figure 1 is a longitudinal section of pipe ends connected together by means according to the invention;

Figure 3 is a sectional elevation of a coupling according to the invention applied to a thin-walled pipe of relatively large diameter, the left hand side of the centre line showing the coupling means as initially applied on the ends of the pipes, and the right-hand side the means after screwing down;

Figure 4 is a section on the line B—B of Figure 3; and

Figure 5 is a sectional elevation of a further modified construction.

Figure 1:
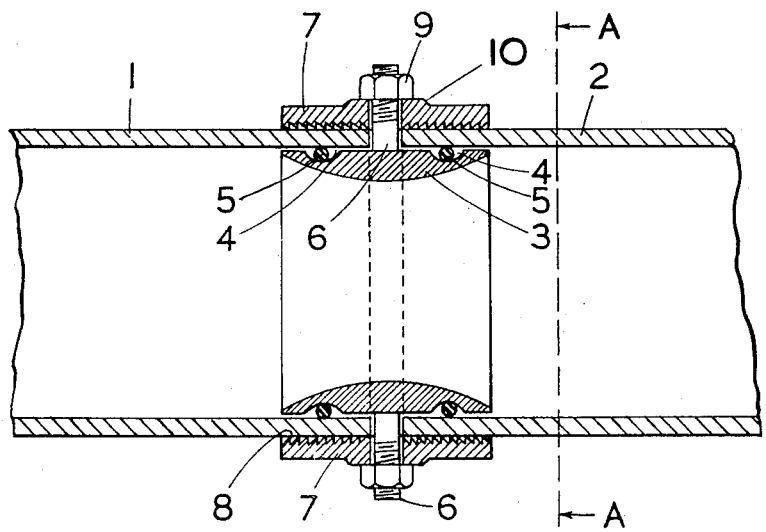
Figure 2:
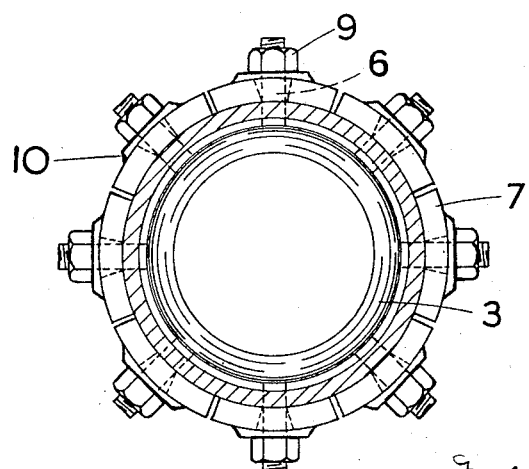
Figure 2 is a transverse section on the line A—A of Figure 1.

In carrying the invention into effect according to the construction illustrated in Figures 1 and 2 of the accompanying drawing, the two ends 1, 2 of relatively thin-walled pipe, made of a high strength material, are located and supported one on each side of a cylindrical member 3.

The member 3 is of uniform cylindrical section and is provided on the outer surface with grooves 4 of shallow section at positions near the edges of the member 3. In the grooves 4 are received rings of resilient material 5. Thus the rings 5 may be made of rubber. The rings 5 are of a section such that when seated in the grooves 4, they normally project beyond the outer surface of the member 3.

The inner surface of the member 3 is of arcuate section tapering towards the edges.

Formed integral with the member 3 to project outwardly and radially at determined positions between the ends of the pipe are studs 6, the ends of which are screw-threaded.

On the projecting ends of the studs 6 are mounted centrally drilled clamping plates 7 which are formed on the undersurface with teeth 8 to engage the outer surfaces of the ends of the pipes.

The plates 7 may be formed to a curvature corresponding to the curvature of the pipes, as shown in Figure 2 of the drawings.

Thus, in operation the ends of the thin-walled pipes 1, 2 are provided as a loose fit around the cylinder 3, the positions of the pipe ends being fixed by abutting against opposite sides of the studs 6. Clamping engagement of the pipe ends is effected by screwing down the nuts 9 on the screw-threaded ends of the studs 6, to seat on flat raised portions 10 formed integral with the plates 7.

An effective liquid and water-tight seal is secured by compression of the rubber rings 5 in the grooves 4. Should the pressure inside the pipe be greater than the pressure outside, the rings 5 will be forced into the outer corners of the grooves 4, and towards the inner corners of the grooves in cases where the pressure outside the pipe is greater than the pressure inside the pipe.

The coupling thus ensures against crushing of the pipe while ensuring an effective seal; while permitting expansion and contraction of the pipe forms a liquid- and gas-tight seal in both directions of application of pressure to the pipe, and provides a coupling of simple construction involving a minimum of parts.

In carrying the invention into effect according to the construction of pipe-coupling illustrated in Figures 3 and 4 of the accompanying drawings, a metal ring 11 in the form of a cylindrical support of an outer diameter to fit into the ends of the pipes 2 to be coupled and curved outwardly on the inner periphery, is provided integrally on the outer periphery with a circumferential series of radially extending studs 12, mounted in spaced relation, the studs separating the ends of the pipes.

The studs 12 are screw-threaded at the ends 13 to receive nuts 14.

At corresponding positions on each side and adjacent the positions at which the studs 12 merge into the ring 11 are formed circumferential grooves 15.

Mounted on the ends of the studs 12 are centrally bored pressure members 16, formed as plates curved to the diameter of the pipes to be coupled and provided with opposite parallel flanges 17.

In operation, on pressure being applied by the nuts 14 on the pressure member 16, the flanges 17 are caused to bite on the ends of the pipes and to deform them to assume the curvature of the grooves 15.

The pipe ends are thus prevented from relative axial movement.

Formed in the outer preiphery of the ring 11 at positions near each side edge is a circumferential shallow and wide groove 18 to receive rings 19 made of a resilient substance such as rubber, which are compressed on pressure being applied by the nuts 14 to form a fluid-tight seal between the rings 19 and the ends of the pipes. If the pressure is greater inside the pipe, the rings 19 are forced towards the inner edges of the grooves, and towards the outer edges if the pressure is greater outside the pipe.

In the modified construction illustrated in Figure 5 of the drawings, the ring 11 is formed in the outer periphery at a mid-position with a groove or channel 20 to receive the laterally flanged base or bases 21 of a series of radially projecting studs 22, operating in the manner of the studs 12 of the construction of Figures 3 and 4. The flanges of the base or bases 21 extend beneath the ends of the pipes to be coupled. A pressure plate 23 of dome-shape or curved section with a central bore is mounted on each stud so that on pressure being applied by screwing a nut 24 on the end of the stud, causes the ends of the pipes to be drawn upwardly and deformed by the flanges so as to be received in the space formed by the configuration of the pressure plate and to follow the curvature, the pipe ends thus being held against axial movement.

The invention is of particular advantage where the method of "nesting" is used in the transport of pipes, one pipe being slid within another, as such method requires that there should be no increase or decrease in the inside or outside diameters of the pipes.

It will thus be understood that the ends of the pipes to be joined may be disposed closely adjacent; that the coupling being of simple construction and of few parts can be quickly and easily mounted and dismounted, and that the application of pressure by drawing the support and the clamping element together by screw means with the pipe walls sandwiched between affords a simple and highly effective method of effecting the coupling without danger of damage to the pipes' couples.

What I claim is:

1. A pipe coupler for coupling thin-walled pipes having a uniform diameter throughout their length comprising a substantially cylindrical supporting element of a diameter sufficient for sliding engagement internally in the ends of the pipes to be coupled, said supporting element being of a substantially uniform diameter at its ends which are internally positioned within the pipes to be coupled, radially extending members with externally screw-threaded ends secured to the supporting element to project outwardly at positions between the adjacent end faces of the pipes through holes formed in clamping elements which are secured in position externally of the pipes by means of nuts screwed on to the projecting screw-threaded ends of the radial members, said clamping elements operable to apply pressure on the rims of the pipes to cause them to bend and hold against relative axial movement.

2. A pipe coupler for coupling thin-walled pipes having a uniform diameter throughout their length comprising a substantially cylindrical supporting element of a diameter sufficient for sliding engagement internally in the ends of the pipes to be coupled, said supporting element being of a substantially uniform diameter at its ends which are internally positioned within the pipes to be coupled, means held in determined relation with respect to the support to project radially between the respective ends of the pipes, clamping elements mounted on the projecting means, and pressure applying means cooperating with the projecting means for applying pressure on said clamping elements to cause the walls of the pipes at the ends to be pressed into engagement with the outer peripheral surface of the substantially cylindrical supporting element.

3. A pipe coupler for coupling thin-walled pipes, having a uniform diameter throughout their length comprising a substantially cylindrical supporting element of a diameter sufficient for sliding engagement internally in the ends of the pipes to be coupled, said supporting element being of a substantially uniform diameter at its ends which are internally positioned within the pipes to be coupled, a circumferential series of screw-threaded studs separating the end faces of the pipes to be coupled and provided in spaced relation on the outer periphery of the supporting element centrally bored pressure members mounted on the studs with downwardly projecting parts, the pressure members being adapted, on pressure being applied by means of nuts screwed on the screw-threaded ends of the studs, to force the downwardly projecting parts against the walls of the pipes to be coupled to deform the walls of the pipes so as to cause them to seat in circumferential grooves formed in the outer peripheral wall of the substantially cylindrical supporting element at positions near the inner ends of the studs.

4. A pipe coupling according to claim 1, in which annular grooves are formed in the outer periphery of the substantially cylindrical supporting element.

5. A pipe coupling according to claim 1, in which the radially projecting means are formed integral with the substantially cylindrical supporting element.

6. A pipe coupling according to claim 1, in which the radially projecting means are formed at the base to be received in recesses of corresponding shape provided in the outer surface of the substantially cylindrical supporting element.

7. A pipe coupling according to claim 1, in which spaces are provided adjacent the outer periphery of the pipes at the ends to receive the ends of the pipes when deformed on the application of pressure, whereby the pipe ends are positively secured to the substantially cylindrical supporting element.

8. A pipe coupling according to claim 1, in which additional circumferential grooves are provided in the outer periphery of the substantially cylindrical supporting element are at positions near the ends of said element, to receive resilient rings, advantageously made of rubber.

9. A pipe coupling according to claim 1, in which additional wide circumferential grooves are provided in the outer periphery of the substantially cylindrical supporting element to enable resilient rings received in the grooves to move from one end of the groove to the other according to the direction of flow of pressure.

10. Pipe-coupling according to claim 9, in which the undersurfaces of the clamping elements are serrated, and the clamping elements are curved to correspond to the outer curvature of the pipes to be joined.

11. Pipe-coupling according to claim 9, in which annular grooves are formed on the outer periphery of the supporting element at positions near each edge to receive sealing rings made of rubber-like material.

12. Pipe-coupling according to claim 9, in which annular grooves are formed on the outer periphery of the supporting element, the grooves being of shallow section to receive sealing rings which are thus adapted to move from one side of the groove to the other according as the pressure is exerted from inside the pipe outwardly or from outside the pipe inwardly, thereby ensuring a liquid- and gas-tight seal.

References Cited in the file of this patent

UNITED STATES PATENTS

| | | |
|---|---|---|
| 180,781 | Morgan | Aug. 8, 1876 |
| 379,845 | Boluss | Mar. 20, 1888 |
| 1,016,878 | Felker | Feb. 6, 1912 |
| 2,092,358 | Robertson | Sept. 7, 1937 |
| 2,143,279 | Osborn | Jan. 10, 1939 |
| 2,449,795 | Stillwagon | Sept. 21, 1948 |
| 2,462,721 | Cohen | Feb. 22, 1949 |
| 2,542,701 | Press | Feb. 20, 1951 |

FOREIGN PATENTS

| | | |
|---|---|---|
| 277,578 | Germany | Aug. 21, 1914 |